Aug. 22, 1933.     A. E. W. JOHNSON ET AL     1,923,930
TRACTOR SPRING TOOTH HARROW
Filed July 5, 1932     2 Sheets-Sheet 1

Fig. 1.

Inventors
A. E. W. Johnson
and W. C. Dwyer
By ...
Atty.

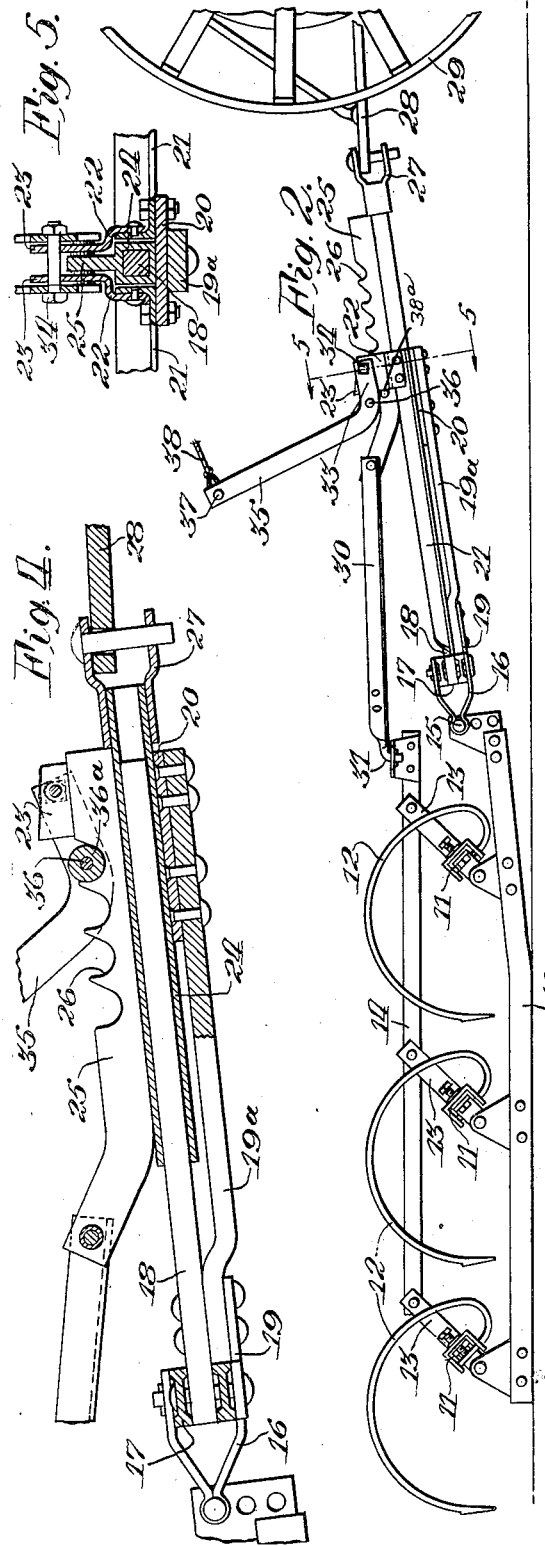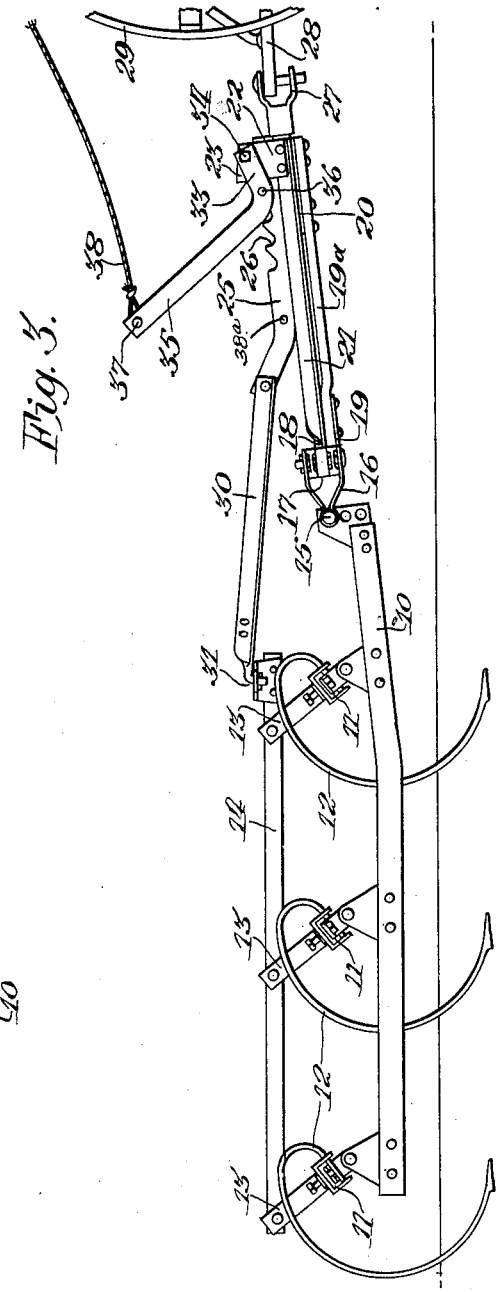

Patented Aug. 22, 1933

1,923,930

UNITED STATES PATENT OFFICE 1,923,930

TRACTOR SPRING TOOTH HARROW

Arnold E. W. Johnson, Chicago, Ill., and William C. Dwyer, Auburn, N. Y., assignors to International Harvester Company, a Corporation of New Jersey Application July 5, 1932. Serial No. 620,818

3 Claims. (Cl. 55—104)

This invention relates to improvements in tractor drawn harrows, and particularly to tractor operated means for rocking the tooth carrying shafts of spring tooth harrows.

The principal objects of the invention are to provide a simple and efficient device, operated by traction, for simultaneously rocking all of the tooth shafts of a multiple unit tractor spring tooth harrow, to effect raising or lowering of the teeth, and to mount said device on a flexible, multiple unit, harrow in such a way that the floating movements of the individual harrow units will not be interfered with.

The foregoing and other minor objects are attained by the organization of parts and details of construction hereinafter described, and illustrated by the accompanying drawings, where:

Figure 1 is a plan view of a tractor drawn spring tooth harrow embodying the invention;

Figure 2 is a side elevation showing the positions of the adjusting means and teeth when the teeth are in raised position;

Figure 3 is a similar view with the teeth in lowered position;

Figure 4 is an enlarged detail view of the draft actuated adjusting mechanism with parts thereof shown in section; and, Figure 5 is an enlarged detail sectional view of the draft mechanism taken on the line 5—5 of Figure 2.

In the present embodiment of the invention there is illustrated a multiple unit harrow composed of two harrow units or frames, each comprising side bars 10 and tooth bars or shafts 11 connecting the side bars 10 and mounted thereon for rocking movement. The rockshafts 11 each have spring harrow teeth 12 secured thereto in any suitable manner in properly spaced relation. The rockshafts 11, of which three are shown on each harrow unit, are provided with upright crank arms 13 disposed in fore and aft alignment and connected to a reciprocable control bar 14 pivotally connected to all of the arms 13 of the unit. The side bars 10 of each unit are flexibly and adjustably connected, as at 15, to short, rearwardly extending coupling arms 16 carried by an elongated, transverse member 17 forming the main member of a transversely extended draft frame from which the harrow units or frames trail. The draft frame also includes a central, forwardly extending, rigid tongue 18 secured at its rear end to the draft frame member 17. This member may be formed of spaced I-beams, as best seen in Figure 4, between which the tongue is secured. The member 17 also has secured thereto, immediately below the tongue 18, a gusset plate 19 on which there is riveted a supporting bar 19ª which bends downwardly to space it from the tongue 18, as shown in Figure 4, and extends forwardly substantially the same distance as the tongue member 18, where it is riveted to a base plate 20. The plate 20 has riveted or otherwise secured thereto the forward ends of diagonal frame members 21, the rear ends of which are secured to the draft member 17.

The forward ends of the members 21 are bent into parallel relation to each other and to the tongue member 18, as best seen in Figure 1, and each of these ends has secured thereto an upright plate 22 formed with inwardly offset, parallel upper portions 23, best seen in Figure 5. The tongue member 18 is preferably square in cross-section and serves as a guide or holding member for the square tubular portion 24 of a slidable draft head, which is telescopically mounted on the member 18, as shown in Figure 4, and rests or slides on the base plate 20. The draft head also includes a vertical flange 25 which is welded or otherwise secured to the upper surface of the tubular portion 24 of the draft head and provided with a series of forwardly inclined ratchet teeth 26. The forward end of the tubular portion of the draft head has a clevis piece 27 welded or otherwise secured thereto and this is adapted to be connected to the drawbar 28 of a tractor, the wheels of which are seen in part at 29.

The rear end of the ratchet flange 25 is pivotally connected to rearwardly diverging links or bars 30, the rear ends of which are pivotally connected at 31 to the reciprocable shaft connecting bars 14 on each of the harrow units. A brace 32 preferably connects the bars 30 to form a unitary connecting frame between the draft head and the tooth bars of the respective harrow sections. With the construction so far described it will be clear that the draft head can be moved back and forth on the tongue member 18 by backward and forward movements of the tractor to which it is connected, and that such movements will be transmitted through bars 30 to the reciprocatory tooth shaft adjusting means comprising the connecting bars 14 on each harrow unit, thereby rocking the shafts 11 in unison to either raise or lower the harrow teeth. In order to control this movement and retain the teeth in either lowered or working position, as in Figure 3, or in raised or transport position, as in Figure 2, there is provided an angular latch lever, the shorter arm 33 of which is pivoted at its end, as at 34, to the upper portions of the plates 23 where these extend above the ratchet flange 25 (Figure 5), and the longer arm 35 of which extends upwardly and rearwardly in offset relation to the pivot 34. At its elbow or angle, the trip lever, which is preferably formed of spaced twin sections or bars, is provided with a transverse pin 36 carrying a suitable roller 36ᵃ which engages the ratchet teeth 26 of the draft head in the manner best seen in Figure 4. Owing to the angular structure of the trip lever and its manner of support, it will be seen that its weight will serve to normally maintain the roller 36ᵃ in engagement with the ratchet and thereby restrain forward movement of the draft head. In order to provide for remote control of the draft head, the upper end of the arm 35 of the latch lever is provided with a transverse pin 37, which serves to space the twin members of the latch lever and also as anchoring point for a forwardly extending control element or cord 38 extending to the operator's station on the tractor. A pull on this cord will serve to rock the lever on its pivot at 34, thereby raising the pin 36 from engagement with the ratchet bar. Forward movement of the draft head is limited by a stop pin 38ᵃ in flange 25 which contacts the rear edges of the plates 23.

The operation of the device will be clear from the above disclosure and by reference to Figures 2 and 3. With the harrow parts in the position of Figure 2, which is the transport position, the operator of the tractor, desiring to lower the harrow teeth, will back the tractor, thereby forcing the draft head rearwardly on the tongue member 18 and causing the ratchet teeth 26 to ride under the roller 36ᵃ on the pin 36 until the harrow teeth have been swung downwardly into desired position, or the limit of rearward movement of the draft head is reached. As the ratchet teeth are inclined forwardly, the parts will be automatically locked as against outward movement of the draft head and the harrow teeth will remain in the position of Figure 3, which is the operating position, until it is again desired to raise the teeth for clearing the same of trash or for transport. When this is desired, the operator will rock the latch lever forwardly by a pull on the cord 38 during forward travel of the tractor, thus releasing the draft head and permitting it to move forwardly with corresponding upward rocking movement of the tooth carrying shafts.

The above disclosure is a preferred embodiment of the invention, which may, however, be varied as to details of construction without departure from the scope of the invention as defined in the following claims.

What is claimed is:

1. A tractor harrow comprising the combination of a transversely extended draft frame including a forwardly projecting central member, a plurality of harrow frames arranged side by side each including side bars flexibly connected to the draft frame at their forward ends and a plurality of rockable shafts connecting the side bars, harrow teeth on the rockable shafts, reciprocable means on each unit connecting the shafts for joint rocking movement to raise or lower the harrow teeth, a draft head slidably mounted on the central member of the draft frame for movement longitudinally thereof and adapted for connection to a tractor, bars connecting the draft head and the reciprocable means on the respective units whereby the shafts are rocked through movement of the draft head, and latch mechanism between the draft head and central member for controlling movement of the draft head by the tractor.

2. A tractor harrow comprising the combination of a transversely extended draft frame including a forwardly projecting tongue, a plurality of independent harrow units arranged side by side and connected to the draft frame each unit including rockshafts having harrow teeth secured thereto, a draft head having a tubular portion slidably mounted on the tongue and a ratchet flange on the tubular portion, means on the forward end of the draft head adapted for connection to a tractor, means connecting the rear end of the draft head with the rockshafts of the respective units for rocking said shafts through movement of the draft head, and a remote control latch lever pivoted on the draft frame in position to engage the ratchet on the draft head.

3. A tractor harrow comprising the combination of a transversely extended draft frame including a forwardly projecting tongue and diagonal members having forward ends terminating adjacent the end of the tongue, a plurality of harrow frames arranged side by side and each flexibly connected to the draft frame for floating movements independently of each other, each frame including a plurality of rockably mounted shafts having harrow teeth secured thereto, a draft head having a tubular portion slidably mounted on the tongue and formed with an upright ratchet flange above the tubular portion, means on the forward end of the draft head adapted for connection to a tractor, bars pivotally connecting the rear end of the draft head with the rockshafts of the respective frames for rocking said shafts through movements of the draft head, upright plates secured to the forward ends of the diagonal members on each side of the draft head and terminating above the ratchet flange, a remote control latch lever having angularly related long and short arms, the short arm being pivoted at its end to the plates above the ratchet flange with the long arm extending upwardly in offset relation to the pivot point of the short arm, a pin located at the angle between the lever arms in position to engage the ratchet flange by weight of the lever, and means for swinging the lever to lift the pin from the ratchet.

ARNOLD E. W. JOHNSON.
WILLIAM C. DWYER.